Feb. 11, 1936. W. L. STROCK ET AL 2,030,726
ADJUSTABLE MOLD FOR BATTERY CELL CONNECTERS
Filed March 6, 1934
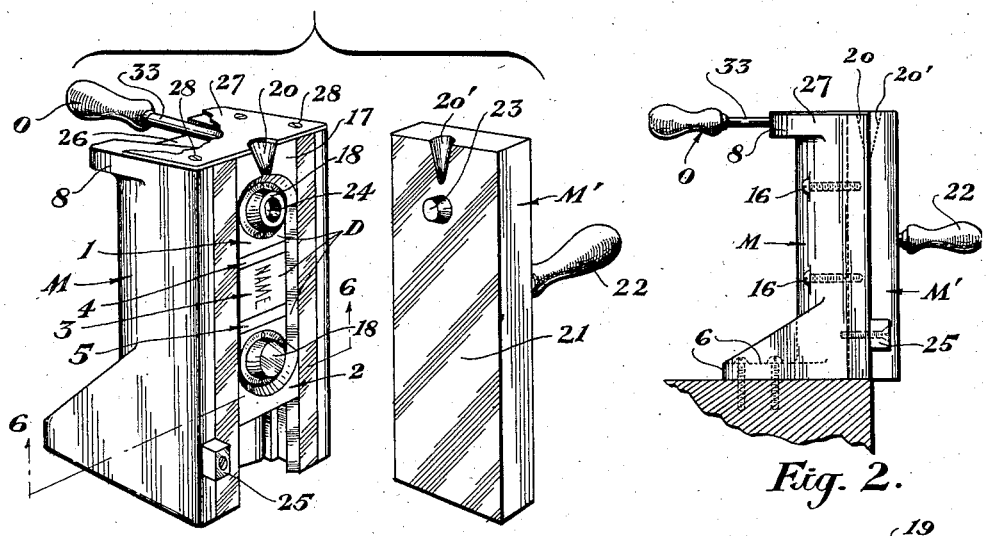
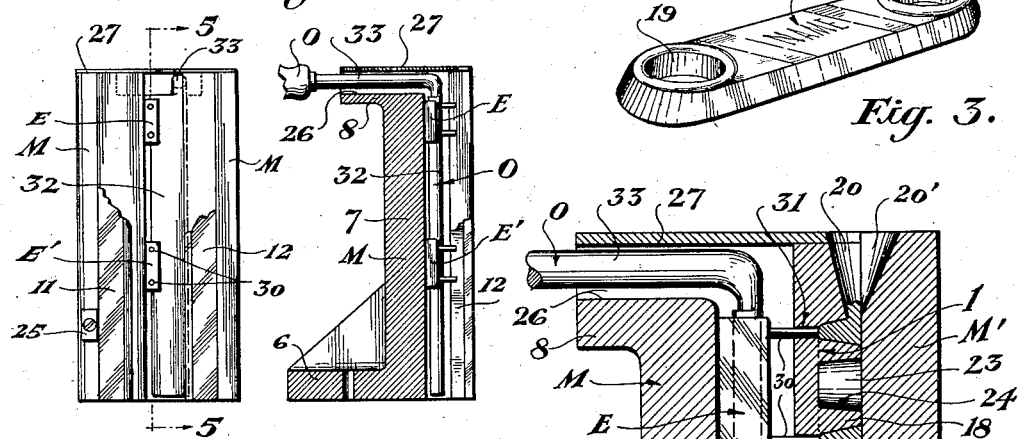
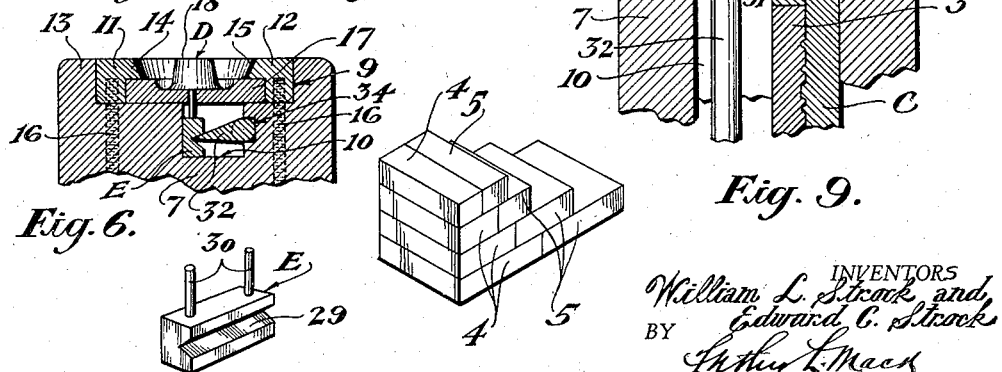

Patented Feb. 11, 1936

2,030,726

UNITED STATES PATENT OFFICE 2,030,726

ADJUSTABLE MOLD FOR BATTERY CELL CONNECTERS

William L. Strock and Edward C. Strock, Los Angeles, Calif.

Application March 6, 1934, Serial No. 714,290

8 Claims. (Cl. 22—136)

This invention relates to and has for a primary object the provision of a simple, durable and efficient adjustable mold for casting battery cell connecters such as are commonly used on automotive and other kinds of electric batteries, whereby new connecters of different length may be quickly made for the purpose of replacing worn and defective connecters, or for the manufacture of connecters for use on new batteries.

Electric storage batteries are of different size and types and accordingly require connecters between the cells thereof which are of different length between the terminal bosses. Replacements of worn or defective connecters are rarely carried in stock by battery repair shops and it is customary to mold new connecters for replacement purposes. Usually it is necessary for repair shops to maintain a complete set of battery connecter molds to meet the demands of variable type and size. Hence, it is an object of this invention to provide a mold for producing connecters of different size, within range of commercial requirements, whereby a mold embodying our improvements may be quickly adapted to a particular type and size of connecter with but a minimum of adjustment and a simple operation of the mold.

In more detail, it is an object of this invention to provide an adjustable mold for the purpose described which includes a stationary mold member and a movable mold member and a die adjustable on said stationary mold member and formed of a plurality of sections including typical end sections for molding the terminal bosses, an intermediate section for molding the name of the battery on the connecters and spacers of different length insertible between the other sections for varying the length of the molded connecters to correspond to the distance between the terminals of adjacent battery cells.

A further object is to provide an ejecting means operative, regardless of the adjustment of the mold, for ejecting the castings from the mold upon the completion of a molding operation. Other objects may appear as the description progresses.

In the accompanying drawing we have shown a preferred embodiment of our invention, subject to modification within the scope of the appended claims without departing from the spirit thereof.

In said drawing:

Fig. 1 is a perspective view of the mold with the members separated;

Fig. 2 is a side elevation of the same closed preparatory to a molding operation;

Fig. 3 is a perspective view of a battery cell connecter adapted to be produced by the mold;

Fig. 4 is a face view of the stationary mold member with the die sections removed therefrom so as to show the ejector;

Fig. 5 is a sectional elevation of the same on line 5—5 of Fig. 4;

Fig. 6 is a fragmentary cross section of the mold on line 6—6 of Fig. 1;

Fig. 7 is a perspective view of one of a pair of ejector elements;

Fig. 8 shows a stack of spacers of different size for varying the length of the casings produced by the mold;

Fig. 9 is an enlarged fragmentary sectional elevation of the mold on line 5—5 of Fig. 4 showing a casting therein.

Briefly described, our mold includes a stationary mold member M and a separable member M' forming a closure, a composite die D including end sections 1 and 2, a central section 3 and a pair of spacers 4 and 5, a pair of ejectors E and E' and a common operating member O, which combine to produce and eject a casting C such as is shown in Fig. 3.

The stationary mold member M has a base 6 adapted to rest upon or be secured to a suitable supporting table or the like and a vertically disposed body 7 provided at its upper end with a flange 8. As shown in Fig. 6, the body 7 has a shallow channel 9 in its face in the bottom of which is formed a narrower longitudinal channel 10. L shaped bars 11 and 12 are seated in and at the lateral margins of the channel 9 with their outer faces flush with the face 13 of the mold body. Bars 11 and 12 have portions 14 and 15 which project inwardly over and are spaced from the bottom of the channel 9 so as to provide a guide and seat for the composite die D. Said bars are preferably secured to the mold body 7 by means of screws 16, 16.

It will be noted that the channel 10 is slightly offset from the center of the channel 9 so that the ejectors E, and E' may be slidably disposed in the channel 10 and in a plane which is equidistant from the opposite margins of the channel 9. The die D is composed of sections 1, 2, 3, 4 and 5 which, though of different dimensions lengthwise of the mold are of the same dimension crosswise of the mold body so that said sections may freely slide in the seat provided between the portions 14 and 15 of bars 11 and 12, respectively, and the bottom of channel 9. Bars 11 and 12, however, when tightly secured in place prevent the movement of the die sections from desired positions of adjustment, but when loosened permit the adjustment of said sections to desired positions.

The end sections 1 and 2 of the die D are of like size and character preferably, though not necessarily, and are formed with flat plates 17 and outwardly projecting bosses 18, for molding the terminal receiving apertures 19 of the connecters, as shown in Fig. 3. The central section 3 is in the form of a flat plate bearing upon its outer face desired indicia representative of the name of a battery, or other matter, while the spacers 4 and 5 are provided in pairs of different width, as shown in Fig. 8, for insertion between the end sections and the central section, for obtaining cast connecters of desired length.

The mold members M and M' are provided at their upper edges with mating grooves 20 and 20' respectively, which, when the mold members are assembled, as shown in Fig. 2, provide an orifice through which metal may be poured into the mold for producing the castings therefrom. It will be observed that the movable mold member M' has a flat inner surface 21 which abuts the face 13 of member M and the outer faces of bars 11 and 12, and a handle 22 is provided on its outer side by means of which the movable mold member may be held in molding position against the member M, applied thereto or removed therefrom. Member M' also has a boss 23 on its inner face adapted to seat in an aperture in boss 18 of the upper die section 1 for centering the mold members in a casting operation, and one or more lugs 25 may be formed on or attached to the outer face of the mold member M for engagement with one or more edges of the member M' for further facilitating the centering and holding of the member M' during a casting operation.

The mold member M serves as a mounting and support for the ejecting mechanism and has formed in its upper flange 8 a shallow recess 26 which is covered by means of a detachable plate 27 secured to said flange by means of screws 28, 28, etc.

The ejectors E and E' are of like form, slightly elongated and of generally rectangular cross section with longitudinal V shaped grooves 29 on corresponding edges. Each ejector has a pair of pins 30, 30 secured thereto and extending outwardly in the direction of the open face of the mold member M, with said pins extending through perforations 31, 31 in the bases of the die sections 1 and 2, as shown in Fig. 9. Thus the ejectors E and E' are slidable with the associated die sections 1 and 2.

The ejector operating member O has a stem 32 of bevelled cross section, as shown in Fig. 4 and a right angularly bent arm 33 continuing therefrom and movable in the recess 26 of flange 8 and to which the handle O is attached. Said stem is seated at one edge in a longitudinal groove 34 formed in the side of channel 10 opposite the grooves 29 in the ejectors E and E', while the opposite edge of stem 32 is seated in the grooves 29 of said ejectors. Thus as the stem 32 is rotated in the groove 34 by oscillating the handle O the ejectors E and E' will be correspondingly moved outwardly or inwardly through the perforations 31 in the die sections 1 and 2.

In operation, the die D is arranged in the mold by the choice of spacers 4 and 5 inserted between the central and end sections thereof, to correspond to the desired length of connecter C to be produced. The mold bars 11 and 12 are then tightened in their positions on the mold body 7 and the mold closing member M' is positioned over the face of the member M and held in position while metal is poured through the orifice 20, 20 after which the mold member M' is removed, and by means of a slight oscillation of member O the stem 32 will project the pins 30, 30 of the ejectors E and E' against the cast connecter in the mold, thereby causing the quick ejection of the casting.

In the consideration of our invention it will be understood that there are several different sizes and types of storage batteries used in the automotive and other industries, and it is necessary for a battery repair establishment to maintain a complete set of the spacers 4 and 5, arranged in pairs of equal length to meet the demands of the trade.

The adjustment of the mold to a desired extent is accomplished merely by loosening the screws 16 so that the die sections are freely slidable in the channel 9, then moving the end and central sections of the die sufficiently apart to insert the spacers of desired width, then adjusting adjacent die sections to abutting positions, and again tightening the screws 16 so as to hold the die immovable during an ensuing molding operation.

What we claim is:

1. A mold comprising: stationary and movable mold sections, said stationary section having a channel adjacent the movable section, a die slidable in said channel, a relatively narrow channel formed in the bottom of said first mentioned channel, an ejector adjustable in said narrow channel to correspond to the adjustment of said die in said other channel, and an operating member pivotally held in said narrow channel and engaging said ejector, for reciprocating the ejector relative to the die in an ejecting operation.

2. A mold comprising: stationary and movable mold sections, a shallow channel being formed in the face of said stationary section adjacent said movable section, a die longitudinally adjustable in said channel, means for securing said die in adjusted position, a narrow channel being formed in said stationary section at the bottom of said shallow channel, an ejector longitudinally adjustable in said narrow channel with said die and independently movable relative to said die in a direction at right angles to its direction of adjustment with said die, and an operating member pivotally held in said narrow channel and adjustably engaging said ejector, whereby the same may be operative at any position of the die and ejector for ejecting an article from the mold.

3. An adjustable mold comprising: a mold body having a longitudinal shallow channel on a face thereof with inwardly projecting ribs at the outer side of the channel, die sections longitudinally adjustable in said channel, means for clamping said die sections in molding position, said body having a relatively narrow channel in the bottom of said outer channel, an ejector longitudinally slidable in said narrow channel for selective adjustment relative to said die sections, and a manually rockable member having an elongated portion position in said narrow channel and slidably engaging said ejector for moving said ejector outwardly in an ejecting operation.

4. An adjustable mold comprising: a mold body having a longitudinal shallow channel on a face thereof with inwardly projecting ribs at the outer side of the channel, die sections longitudinally adjustable in said channel, means for clamping said die sections in molding position, said body having a relatively narrow channel in the bottom of said outer channel, an ejector longitudinally slidable in said narrow channel for selective adjustment relative to said die sections, a manually rockable member having an elongated portion positioned in said narrow channel and slidably engaging said ejector for moving said ejector outwardly in an ejecting operation, and a mold closing member separably held on said mold body for forming a cavity of said outer channel during a casting operation.

5. A mold comprising: a channeled member having inwardly turned portions on its outer face for providing a mold cavity, a mold closing member detachably held thereon, die sections longitudinally adjustable in said cavity and having opposite margins underlying said inwardly turned portions, means for clamping said die sections in molding position, and an ejecting mechanism including a longitudinally adjustable ejector underlying said die sections for selective association with said die sections and a manually rockable member also underlying said die sections and slidably engaging said ejector, for ejecting the castings from said mold.

6. A mold comprising: a channeled member having inwardly turned portions on its outer face for providing a mold cavity, a mold closing member detachably held thereon, die sections longitudinally adjustable in said cavity and having opposite margins underlying said inwardly turned portions, means for clamping said die sections in molding position, and an ejecting mechanism including a longitudinally adjustable ejector underlying said die sections for selective association with said die sections and a manually rockable member also underlying said die sections and slidably engaging said ejector, for ejecting the castings from said mold, said manually rockable member having a longitudinal portion with one edge pivoted in said mold member and its opposite edge adjustably engaging a side of said ejector and a handle externally of said mold member.

7. A mold for articles comprising a body mold member and a separable mold closing member, said body mold member having a longitudinal channel on its outer face forming a cavity adapted to be closed by said mold closing member, a plurality of die sections longitudinally adjustable in said cavity, means for clamping said sections in fixed positions during a molding operation, said body member having an inner channel longitudinally formed therein, an ejector longitudinally adjustable in said inner channel for selective association with said die sections, and manually operable means rockable in said inner channel and engaging said ejector regardless of the position of the ejector, whereby the ejector may be extended in an ejecting operation.

8. A mold for articles comprising a body mold member and a separable mold closing member, said body mold member having a longitudinal channel on its outer face forming a cavity adapted to be closed by said mold closing member, a plurality of die sections longitudinally adjustable in said cavity, means for clamping said sections in fixed positions during a molding operation, said body member having an inner channel longitudinally formed therein, an ejector longitudinally adjustable in said inner channel for selective association with said die sections, and manually operable means rockable in said inner channel and engaging said ejector regardless of the position of the ejector, whereby the ejector may be extended in an ejecting operation, said ejector having pins projecting outwardly therefrom and through said die sections and a longitudinal groove on a side thereof adapted to be engaged by an edge of said manually operable means.

WILLIAM L. STROCK.
EDWARD C. STROCK.